United States Patent [19]

Priestley

[11] 4,385,012

[45] May 24, 1983

[54] PHASE-CONTACTING APPARATUS

[76] Inventor: Ronald Priestley, 84, Chesterwood Rd., Birmingham 13, England

[21] Appl. No.: 228,185

[22] Filed: Jan. 26, 1981

[30] Foreign Application Priority Data

Jan. 28, 1980 [GB] United Kingdom ............... 8002816

[51] Int. Cl.³ .............................................. B01F 3/04
[52] U.S. Cl. .................................... 261/112; 202/158; 210/150; 261/DIG. 11; 422/310; 428/178; 428/184
[58] Field of Search ....... 261/112, DIG. 11, DIG. 72; 202/158; 428/178, 184; 210/150, 151; 422/310

[56] References Cited

U.S. PATENT DOCUMENTS

| 3,151,675 | 10/1964 | Lysholm | 261/112 X |
| 3,415,502 | 12/1968 | Munters | 261/DIG. 11 |
| 3,450,393 | 6/1969 | Munters | 261/112 |
| 3,466,019 | 9/1969 | Priestley | 261/112 |
| 3,475,012 | 10/1969 | Britton et al. | 261/DIG. 11 |
| 3,599,943 | 8/1971 | Munters | 261/112 X |
| 3,652,066 | 3/1972 | Faigle | 261/112 X |
| 3,704,869 | 12/1972 | Priestley | 261/112 |
| 3,733,063 | 5/1973 | Loetel et al. | 261/112 |
| 3,878,272 | 4/1975 | Priestley | 261/112 |
| 4,014,962 | 3/1977 | Del Notario | 261/112 |

FOREIGN PATENT DOCUMENTS

| 1055797 | 1/1967 | United Kingdom . |
| 1055798 | 1/1967 | United Kingdom . |
| 1073316 | 6/1967 | United Kingdom . |
| 1106566 | 3/1968 | United Kingdom . |
| 1286244 | 8/1972 | United Kingdom . |
| 1444197 | 7/1976 | United Kingdom . |
| 1559329 | 1/1980 | United Kingdom . |
| 1559330 | 1/1980 | United Kingdom . |

Primary Examiner—Richard L. Chiesa
Attorney, Agent, or Firm—Leydig, Voit, Osann, Mayer and Holt, Ltd.

[57] ABSTRACT

Packing sheets are disclosed each of which consists of a flat base and parallel tube sectors formed thereon, alternately on opposite sides of the base. The walls of the tube sectors are corrugated preferably transversely to their length. Such sheets may be assembled together, e.g. using integral joint members, to form packing units of high efficiency for use in phase contacting applications such as cooling and distillation towers.

14 Claims, 6 Drawing Figures

A B

C D

PHASE-CONTACTING APPARATUS

This invention relates to phase contacting apparatus and particularly to packings for use therein.

In modern process technology a very wide variety of phase contacting operations are carried out using apparatus comprising a contacting chamber including a packing. Two basic types of packing are known, so-called dumped packings and regular packings. The present invention is concerned with regular packings and in particular packings formed of an array of packing sheets.

Examples of phase contacting apparatus in which the present invention is applicable include gas/liquid contact apparatus such as gas absorption apparatus, distillation apparatus, heating and cooling apparatus, humidifiers, biological oxidation and biological filtration apparatus. Gas/liquid reactors and mixers and cooling towers may also be provided with packings according to the present invention. British Patent Specifications 1,055,797, 1,055,798, 1,073,316, 1,106,566, 1,286,244, 1,444,197, 1,559,329 and 1,559,330, and U.S. Pat. Nos. 3,599,943, 3,450,393 and 3,415,502 are representative of the prior art in this field.

Liquid/liquid extraction processes and liquid/liquid reactors and mixers may also include a chamber including a packing of the invention. The packing may also act as a support for a solid catalyst in catalytic reactors. The packing of the present invention is also useful in providing improved distribution within a solid bed as used for example in adsorption, ion exchange and catalytic reactors where good contact between a fluid and a solid is desirable.

In all these phase contacting processes it is desired to promote extensive contact action between the phases being contacted. In the case of liquids this may be achieved by spreading out the liquid on a large surface area of a packing but this alone sometimes proves unsatisfactory since very high surface area packings tend to be resistive to flow through them and this is disadvantageous.

According to a first feature of the present invention there is provided a packing sheet for use in contacting, which sheet comprises a substantially flat base, a plurality of parallel straight tube sectors formed in the sheet and projecting alternately each side of the plane of the flat base, each tube sector being separated from its neighbour by a strip of the substantially flat base, and the surface of the tube sector being corrugated.

In order to form a packing from such sheets, a plurality of such sheets are arranged adjacently so that the tube sectors form an array of passageways while the corrugations constitute corrugations of the walls of those passageways.

The peaks and valleys of the corrugations preferably run in planes substantially transverse to the longitudinal direction of the tube sectors.

When such a packing is used in a phase contacting apparatus the tubular sectors provide passageways for fluid between adjacent sheets of the packing while the corrugations promote turbulence in the fluid flowing through those passageways. By careful design of the tube sector shape and the corrugations, it is possible to produce packings which give an acceptable compromise between a very low pressure drop across the packing (i.e. the energy requirements to pass the material to be contacted through the packing are relatively low) and high contact efficiency accompanied by high turbulence at the surface of the packing.

It is believed that the turbulence promoted by the corrugations combines with turbulence produced by the edges of the flat strip where they meet the corrugated tubed sectors to give rise to the improved mass transfer properties observed using packings of the present invention. The flat strips also aid in increasing the rigidity of the module formed of an assembly of such packing sheets.

By careful design it is possible to produce packings in which a number of sheets of identical shape can be assembled in an array to form a packing unit. This is desirable as reducing both the cost of manufacture of the sheets (only one mould or the like is necessary) and reducing the complexity of assembly (there is only one type of sheet to assemble).

The packing sheets of the present invention fall into two distinct families which constitute preferred specific embodiments of the packing sheets of the present invention.

In one of these, each of the packing sheets is substantially rectangular and the primary corrugations which form the tube sectors run parallel to one of the edges of the sheet. In this type the sheets are assembled to form rectangular parallelepiped packing units in each of which the passageways formed by the tube sectors run perpendicular to two opposite faces of the rectangular parallelepiped. Such a packing unit is particularly useful in gas/liquid contacting applications e.g. cooling towers where the packing units are arranged with the tubes or passageways substantially vertical. The corrugations may be such that the passageways are of substantially constant cross-section or of varying cross-section. This may be arranged by having the corrugations 180° or less out of phase with one another in adjacent tube sectors. By varying the phase of the corrugations in adjacent sectors an appropriate compromise may be selected between pressure drop and optimum mass transfer.

A second particularly preferred family of packing sheets is one in which the individual packing sheets are each substantially rectangular while the tube sectors run at an acute angle to one edge of the sheet, e.g. an angle of substantially 45°. Packing units may be assembled from a plurality of such sheets with the tube sectors running at right angles in adjacent sheets. This gives an extremely open but intricate structure which is found in fluid mixing applications to give extremely good fluid mixing accompanied by low pressure drop across the packing unit and very high mass or heat transfer coefficients.

In both the above families, it is easily arranged that the meeting points at which adjacent sections are held together are regularly and evenly spaced, and are at the peaks of the corrugations. Even if the angle between the tube sectors in adjacent sheets is other than 0° or 90°, by arranging the wavelength of the corrugations appropriately, relative to the spacing of the tube sectors, any intermediate angle may be chosen while still giving a regular array of contact points between adjacent sheets located on the peaks of the corrugations for the purpose of fixing those sheets together.

The packing sheets may be made from a wide variety of materials by methods appropriate to those materials. Of particular value are sheets made of thermoplastic sheet material by vacuum or pressure forming or by an appropriate casting process. Metal packings may be produced e.g. by pressing though care needs to be taken in the design of the corrugations of such packing to ensure that the metal can be pressed satisfactorily to the desired shape. It may be necessary to use highly plastic or deformable alloys to achieve the desired corrugation. The material of the sheet may be homogeneous and liquid impermeable or it may be perforated or of "expanded mesh" structure. It may also be made of woven or knitted material.

As well as the tube sector formation and the corrugations, each sheet may be provided with a fine secondary corrugation or dimpling which is small with respect to the corrugation of the tube sectors. Such a secondary corrugation promotes spreading of liquid over the sheet surface in gas/liquid contacting applications.

In order to assist the assembly of the sheets together, they may be provided with a number of joint members, e.g. studs or flattened areas, such joint members coming to lie adjacent when two sheets are placed together during assembly and which may mate, e.g. by being male and female interengaging portions, or which may be secured to one another e.g. by clips, staples, ties, adhesion or welding. The spacing between the sheets may be varied by the positioning of such joint members, and/or by varying the amount by which such members protrude from the flat base of the sheet. The distance of such joint members from the flat base can be adjusted easily in the case of the vacuum formed thermoplastic sheets by having replaceable joint member-forming spigots and wells in the moulding tool and sets of spigots and wells of different heights and depths.

The exact configuration of the tube sectors and of the corrugations may vary widely. A particular tube sector configuration of value is that of a succession of semicircular or semisinusoidal sections, alternately oppositely directed relative to the plane of the sheet, which is defined by the substantially flat base.

A preferred corrugation is one in which, in longitudinal section, the tube wall has a profile of alternate oppositely curved portions joined by relatively short straightline linking portions.

Packings according to the present invention may be built up from a number of packing units as noted, preferably of rectangular parallelepiped shape. In order to consolidate such rectangular shapes they may be surrounded by a belt or wrapping. A plastics net wrapping is of value in a number of applications.

If desired, in between adjacent sheets of the packing units there may be perforate webs of material e.g. fibrous cloths which are substantially flat and which increase the overall surface area of the packing.

The physical size of the tube sectors, the corrugations and of the individual packing sheets and of the packing units made therefrom may vary very widely and will depend upon the particular application concerned. In water cooling applications a sheet of 30 to 240 cm square is a convenient size, an assembly of such sheets being made up e.g. into a cube of side 30 to 240 cm. In such a case the spacing between adjacent tube sectors on the same side of the flat base may be 2.5 to 20 cm, the wavelength of the corrugations 0.5 to 20 cm, the amplitude of the corrugations of 0.25 to 5 cm and a sheet spacing of 3 to 20 cm. Thus, a typical sheet may have a tube sector spacing of 7 cms, a corrugation wavelength of 7 cms a corrugation amplitude of 6 mm, a flat base width of 3 mm and a sheet spacing of 3 cms. The sheet spacing may be less than 3 cms e.g. as little as 1 cm or even less in plate heat exchanger applications.

The width of the strips of the substantially flat base may be constant or vary (depending on whether the corrugations in adjacent tube sectors are in or out of phase). A typical range of widths is 2 to 10 mm, but the width may even drop to zero at certain points along the length of the strip where the tube sectors on opposite sides of the strip are out of phase. In place of square sheets, non-square rectangular sheets may be made up into assemblies of rectangular parallelepiped shape.

If desired in certain applications the packing may have fluid feed devices attached thereto to isolate one or more sets of passageways through the packing from other passageways through the packing. Such arrangements can be valuable in heat transfer applications where contact between the fluid phases between which heat is transferred is not desired. Also the sheets may be reinforced at their edges, e.g. with L- or T-section strips, for general strengthening and, in particular, for reinforcing the assembly edges where they rest on the packing support frame, e.g. in a cooling tower.

The accompanying drawings show two packing units according to the invention.

Figure 1:
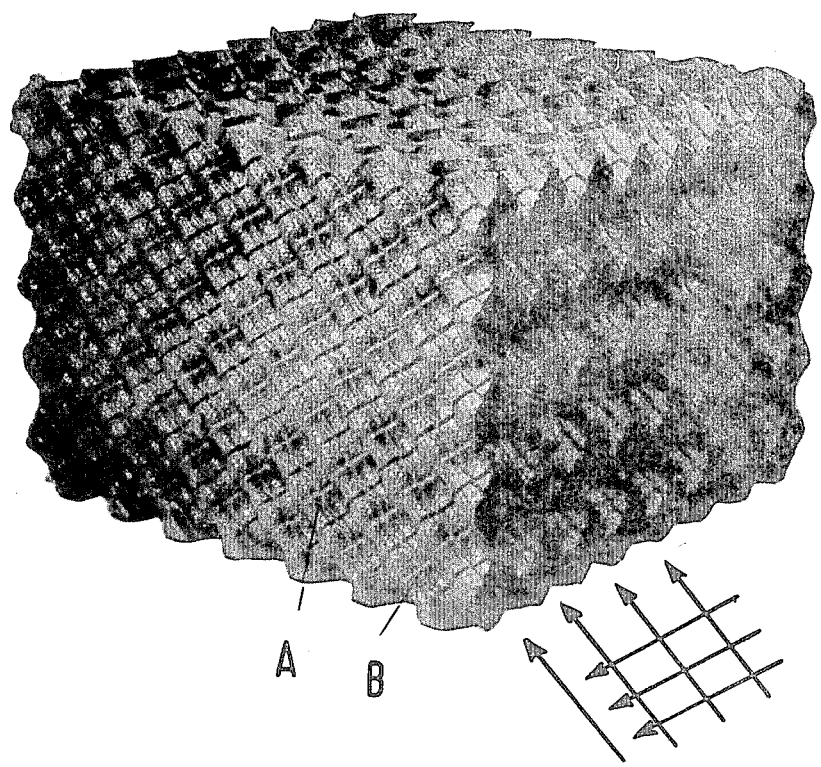
FIG. 1 shows a packing unit in which the tube sectors run at 45° to the substantially rectangular sheets from which the packing unit is made.

Referring to FIG. 1, each packing sheet has tube sectors A, corrugations B, and is dimpled overall.

Figure 2:
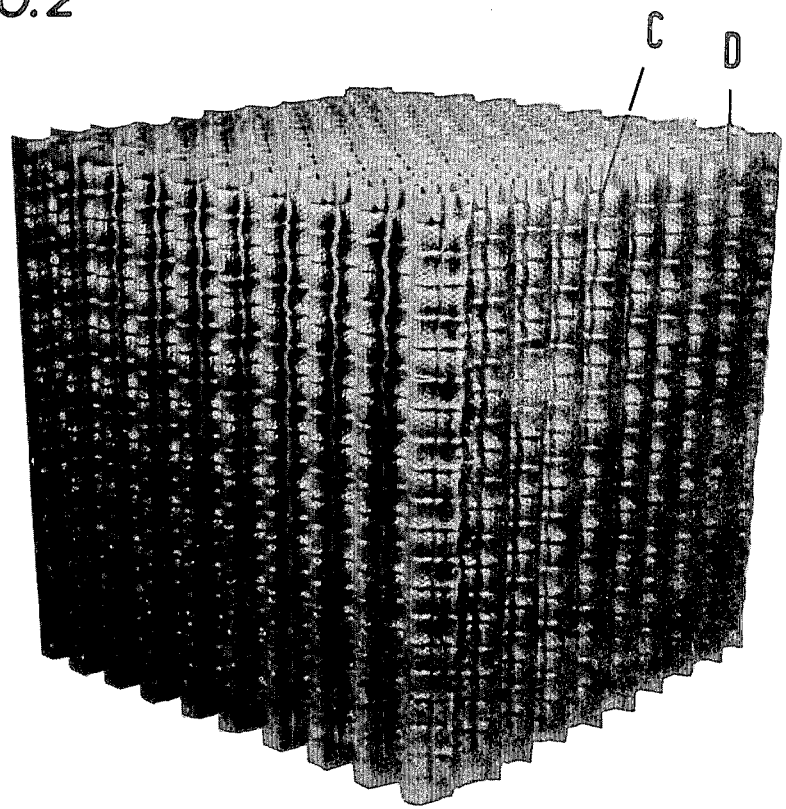
FIG. 2 shows a packing unit in which the tube sectors are vertical and run parallel to the side of the square sheets from which the packing unit is constructed.

FIG. 2 shows a packing of which each sheet has tube sectors C, corrugations D and is overall dimpled. The passages formed in the packing of FIG. 2 are all parallel. The passages formed in the packing of FIG. 1 form two orthogonal parallel arrays as indicated by the arrows.

In operation as a cooling tower packing (where warm water is cooled with a countercurrent stream of air) the packing elements constructed according to the present invention with vertical channels show a most marked increase in effectiveness as compared with the preferred construction described in British Pat. No. 1,286,244. For example at a water loading of 7322 kg/hr. m$^2$ and an air velocity of 213 cm/sec. the rate of mass transfer as measured by the Height of a Transfer Unit (H.T.U.) is 122 cm. To achieve this rate of mass transfer using the construction described in British Pat. No. 1,286,244 some 30% greater area of plastics sheet is required than is required using the present invention.

Figure 3:
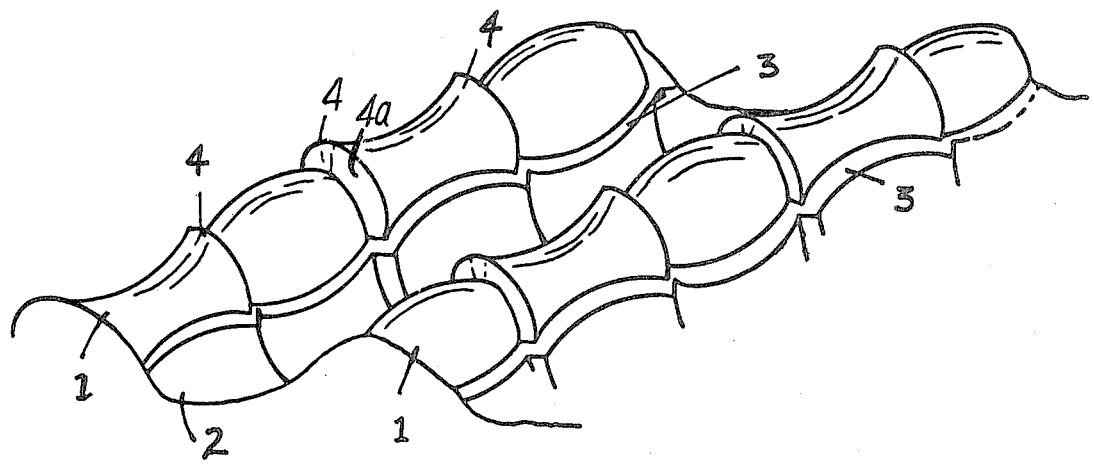
FIG. 3 is a fragmentary perspective view of a packing sheet of this invention.

Now referring to FIG. 3, a preferred form of a packing sheet has two upwardly curved tubular sectors 1 and a downwardly curved sector 2. Between these oppositely curved sectors are narrow, flat strips 3 of the substantially flat base from which the tubular sectors are formed. The walls of the tube sectors are themselves corrugated with regularly repeating corruguations 4 forming short linking portions 4A joining oppositely curved portions 5 of the tube sectors.

Figure 4:
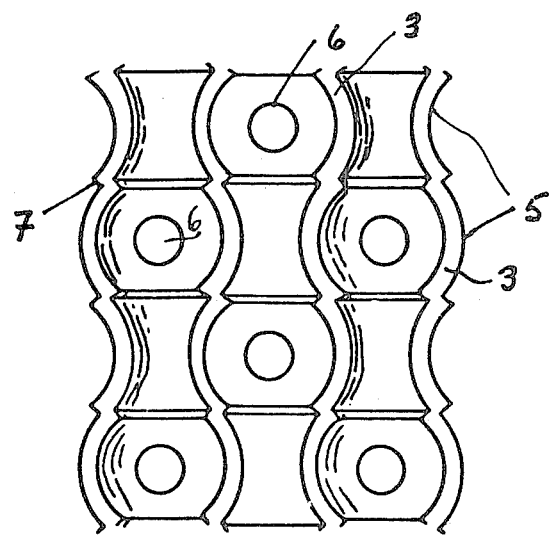
FIG. 4 is a fragmentary plan view of a packing sheet.
Figure 5:
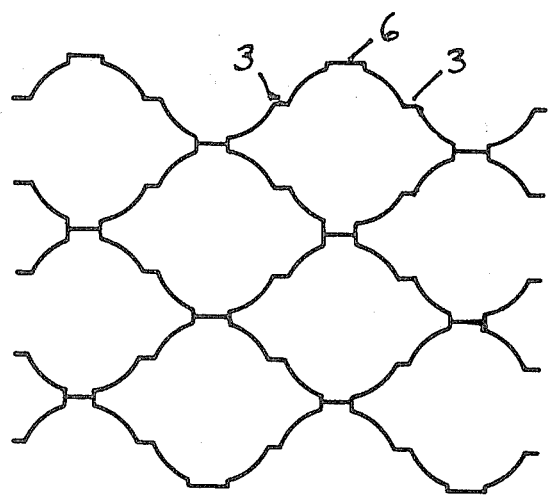
FIG. 5 is a line drawing representing a fragmentary sectional view taken in a horizontal plane through a packing unit in which the tube sectors are vertical as in FIG. 2.

FIG. 4 shows a view of a packing sheet arranged with vertical tube sectors through which the gas flows upwards. On this form of packing sheet, circular studs 6 are located on each of the convex tube sectors on the peaks of the corrugations, while FIG. 5 represents a horizontal sectional view of a packing unit of sheets with the view taken through the center lines of circular studs 6. This view illustrates how the wavelength of regularly repeating corrugations of the tube sectors and the spacing of the tube sectors in both sheets are related so that the circular studs 6 of one sheet are aligned with studs in the adjacent sheets. The studs may be held in place with adhesive. As illustrated, the lateral spacing between studs 6 is the same as the longitudinal spacing between studs 6 so that they abut the strips 3 of the flat based portions where they meet the tube sectors and provide edges which produce turbulence as hereinbefore stated.

Figure 6:
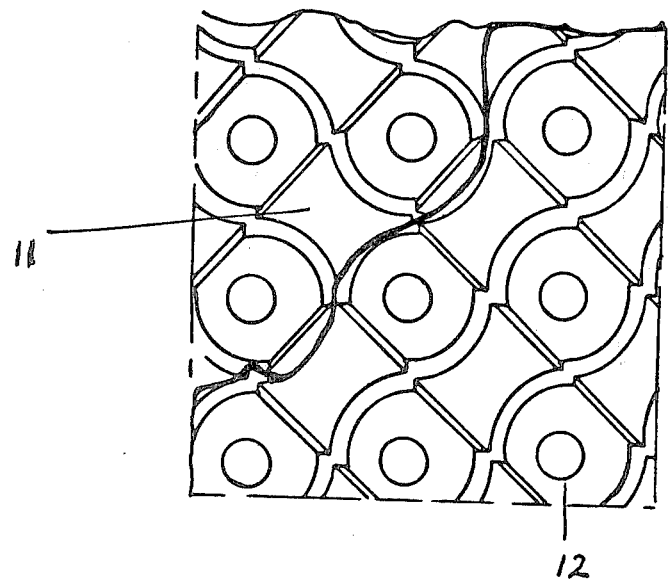
FIG. 6 is a vertical plan view of two adjacent packing sheets with tube sectors arranged at 45 degrees to the vertical as in FIG. 1.

FIG. 6 shows how adjacent sheets are arranged when the tubular sectors are inclined at 45 degrees to the vertical as in FIG. 2.

I claim:

1. A packing sheet for use in contacting, and comprising a substantially flat base, a plurality of parallel straight tube sectors formed in the sheet and projecting alternately each side of the plane of the flat base, each tube sector being separated from its neighbour by a strip of the substantially flat base and providing pathways for fluid flow therethrough, and a series of regularly repeating transverse corrugations in the surface of the tube sectors, said tube sectors having a longitudinal profile of regularly repeating alternate oppositely curved portions formed by said transverse corrugations, such that turbulence is promoted at the boundary of fluid flow through said pathways by said transverse corrugations on the surface of said tube sectors and at the edges thereof where said transverse corrugations meet said strips.

2. The packing sheet of claim 1 wherein the peaks and valleys of the corrugations of the tube sectors run in planes substantially transverse to the longitudinal direction of the tube sectors.

3. The packing sheet of claim 1, wherein the corrugations in the tube sectors are such that in longitudinal section the tube wall has a profile of alternate oppositely curved portions joined by relatively short straightline linking portions.

4. The packing sheet of claim 1 wherein at least some of the tube sectors bear joint members formed and arranged to mate with the joint members of an identical sheet to enable the sheets to be assembled together to form a packing unit by affixture of one sheet to the next via the joint members.

5. The packing sheet of claim 4 wherein the joint members are formed as interengaging male and female members.

6. The packing sheet of claim 1 wherein the sheet is rectangular and the tube sectors run parallel to two opposite edges thereof.

7. The packing sheet of claim 1 wherein the sheet is rectangular and the tube sectors run substantially at an angle of 45° to the edges of the sheet.

8. A packing unit for use in contacting, said packing unit comprising a plurality of packing sheets assembled together, each packing sheet having a substantially flat base, a plurality of parallel straight tube sectors formed in the sheet and projecting alternatively each side of the plane of the flat base, said sheets being assembled with tube sectors of adjacent sheets arranged at an angle, each tube sector being separated from its neighbour by a strip of the substantially flat base, and the surface thereof having a series of regularly repeating transverse corrugations, and said packing sheets being held together and in contact to define between adjacent packing sheets a plurality of pathways provided by said tube sectors for fluid flow therethrough, said tube sectors having a longitudinal profile of regularly repeating alternate oppositely curved portions formed by said transverse corrugations, such that turbulence is promoted at the boundary of fluid flow through said pathways by said transverse corrugations on the surface of said tube sectors and at the edges thereof where said transverse corrugations meet said strips.

9. The packing unit of claim 8, further comprising joining means including inter-engaging joint members formed on adjacent sheets.

10. The packing unit of claim 8 further including means holding the sheets together comprising a net casing about the exterior of the assembly of sheets.

11. The packing unit of claim 8 wherein tube sectors of adjacent sheets are parallel.

12. The packing unit of claim 8 wherein tube sectors or adjacent sheets are substantially at right angles.

13. The packing unit of claim 8 wherein tube sectors of adjacent sheets are arranged at an angle between 0 degrees and 90 degrees.

14. Apparatus for contacting including a plurality of packing sheets adapted to receive a liquid contacting the surface of the packing sheets, each packing sheet comprising a substantially flat base, a plurality of parallel straight tube sectors formed in the sheet and projecting alternately each side of the plane of the flat base, each tube sector being separated from its neighbour by a strip of the substantially flat base, and the surface of the tube sectors having transverse corrugations, and said plurality of packing sheets being adjacently arranged in contact with tube sectors of adjacent sheets being arranged at a predetermined angle providing pathways for fluid flow, said tube sectors having a longitudinal profile of regularly repeating alternate oppositely curved portions formed by said transverse corrugations, such that turbulence is promoted at the boundary or fluid flow through said pathways by said transverse corrugations on the surface of said tube sectors and at the edges thereof where said transverse corrugations meet said strips, the wavelength of said repeating curved portions relative to the spacing of the tube sectors being such as to provide regular and evenly spaced contact points for adjacent sheets on the peaks of said tube sectors when said tube sectors are arranged at said predetermined angle.

* * * * *